US 11,374,510 B2

(12) United States Patent
Hellinga et al.

(10) Patent No.: US 11,374,510 B2
(45) Date of Patent: Jun. 28, 2022

(54) METHOD AND APPARATUS FOR CONTROLLING AN ELECTRIC MOTOR

(71) Applicant: Sevcon Limited, Gateshead (GB)

(72) Inventors: Richard Hellinga, Gateshead (GB); Jason Wiseman, Gateshead (GB); Howard Slater, Gateshead (GB); Chris Pearce, Gateshead (GB)

(73) Assignee: BorgWarner Gateshead Limited, London (GB)

( * ) Notice: Subject to any disclaimer, the term of this patent is extended or adjusted under 35 U.S.C. 154(b) by 93 days.

(21) Appl. No.: 16/305,166

(22) PCT Filed: May 23, 2017

(86) PCT No.: PCT/GB2017/051437
§ 371 (c)(1),
(2) Date: Nov. 28, 2018

(87) PCT Pub. No.: WO2018/002574
PCT Pub. Date: Jan. 4, 2018

(65) Prior Publication Data
US 2020/0321898 A1    Oct. 8, 2020

(30) Foreign Application Priority Data
Jun. 30, 2016  (GB) ..................... 1611490

(51) Int. Cl.
*H02P 6/06*  (2006.01)
*B60L 3/06*  (2006.01)
(Continued)

(52) U.S. Cl.
CPC ............... *H02P 6/06* (2013.01); *B60L 3/06* (2013.01); *B60L 15/04* (2013.01); *H02P 23/14* (2013.01); *H02P 27/06* (2013.01)

(58) Field of Classification Search
CPC ......... G05B 11/01; G06F 17/00; G06F 19/00; G06F 9/45; H02P 3/02; H02P 5/00;
(Continued)

(56) References Cited

U.S. PATENT DOCUMENTS 5,598,077 A    1/1997  Matsubara et al.
8,297,068 B2 *  10/2012  Yokouchi .............. F04D 27/004
62/239
(Continued)

FOREIGN PATENT DOCUMENTS

KR    1020090055053 A    6/2009

*Primary Examiner* — Said Bouziane
(74) *Attorney, Agent, or Firm* — Temmerman Law; Mathew J. Temmerman

(57) ABSTRACT

A method for controlling an electric motor is described herein. The method comprises setting a current limit, a speed limit and a torque limit. The method also comprises sensing a DC link current, comparing the sensed DC link current with the current limit and adjusting the torque limit based on the comparison with the current limit to provide an adjusted torque limit. The method also comprises sensing the speed of the electric motor, comparing the speed with the speed limit and further adjusting the adjusted torque limit based on the comparison with the speed limit.

3 Claims, 5 Drawing Sheets

(51) Int. Cl.
  *B60L 15/04* (2006.01)
  *H02P 23/14* (2006.01)
  *H02P 27/06* (2006.01)
(58) Field of Classification Search
  CPC .... H02P 6/00; H02P 4/00; H02P 23/00; H02P 29/00; H02K 11/24; B60L 15/04; B60L 3/06
  See application file for complete search history.

(56) References Cited

U.S. PATENT DOCUMENTS

| | | | |
|---|---|---|---|
| 8,598,816 | B2 | 12/2013 | Iesaki |
| 9,459,550 | B2 | 8/2016 | Kim et al. |
| 9,893,674 | B2 * | 2/2018 | Ikai ............ H02P 3/22 |
| 2008/0303475 | A1 * | 12/2008 | Patel ............ H02P 21/141 |
| | | | 318/634 |
| 2011/0133678 | A1 * | 6/2011 | Tomigashi ............ H02P 27/08 |
| | | | 318/400.04 |
| 2012/0217908 | A1 | 8/2012 | Wu |
| 2012/0221183 | A1 | 8/2012 | Wu et al. |
| 2013/0300334 | A1 | 11/2013 | Tooyama et al. |
| 2015/0236632 | A1 | 8/2015 | Marohl et al. |
| 2016/0028331 | A1 * | 1/2016 | Hashimoto ............ H02P 3/14 |
| | | | 318/479 |
| 2017/0163194 | A1 | 6/2017 | Sakamoto et al. |
| 2017/0233926 | A1 * | 8/2017 | Jung ............ H02P 6/08 |
| | | | 68/12.16 |
| 2017/0317617 | A1 | 11/2017 | Cempbell et al. |

* cited by examiner

METHOD AND APPARATUS FOR CONTROLLING AN ELECTRIC MOTOR

FIELD OF THE INVENTION

The present disclosure relates to methods and apparatus for controlling an electric motor.

BACKGROUND

Electric motors may be controlled using a vehicle control unit sending instructions to a motor controller. The motor controller may comprise a motor control algorithm to control operation of the electric motor via an inverter coupled to a power supply. The output of the motor controller may be based on the instructions received from the vehicle control unit. In use, current operating conditions may affect how the electric motor responds to these instructions. How the electric motor responds to the instructions may affect how resources are used and/or affect drive feel, and if not managed carefully may lead to damage of the motor, the motor controller and/or the power supply. For example, if the current drawn by the electric motor is too high the electric motor, the motor controller and/or the power supply may be damaged.

SUMMARY OF THE INVENTION

Aspects of the invention are as set out in the independent claims and optional features are set out in the dependent claims. Aspects of the invention may be provided in conjunction with each other and features of one aspect may be applied to other aspects.

DRAWINGS

Embodiments of the disclosure will now be described, by way of example only, with reference to the accompanying drawings, in which.

SPECIFIC DESCRIPTION

Embodiments of the disclosure relate to a method and apparatus for controlling an electric motor, for example an AC electric motor powered by a DC power supply, for example from a battery. In general, the disclosure relates to a method and apparatus for controlling an electric motor by controlling a torque demand sent to the electric motor. The torque demand may be controlled by a controller. The controller's job is to follow an input torque demand without exceeding limits for speed, torque, DC link current, DC link voltage, as well as optionally acceleration, jerk, backlash and thermal limits.

In some aspects of the disclosure, the method may comprise setting a current limit, a speed limit and a torque limit, sensing a DC link current, comparing the sensed DC link current with the current limit, and adjusting the torque limit based on the comparison with the current limit to provide an adjusted torque limit. The method further comprises sensing the speed of the electric motor, comparing the speed with the speed limit and further adjusting the adjusted torque limit based on the comparison with the speed limit.

In other aspects of the disclosure, the method may comprise setting a limit of the DC link current based on sensing the DC link voltage, and adjusting this current limit based on a comparison of the voltage with the voltage limit, setting a torque limit based on sensing: (a) the DC link current and (b) the speed, and adjusting the torque limit based on (a) a comparison of the DC link current with the current limit, and (b) a comparison of the speed with the speed limit.

Figure 1:
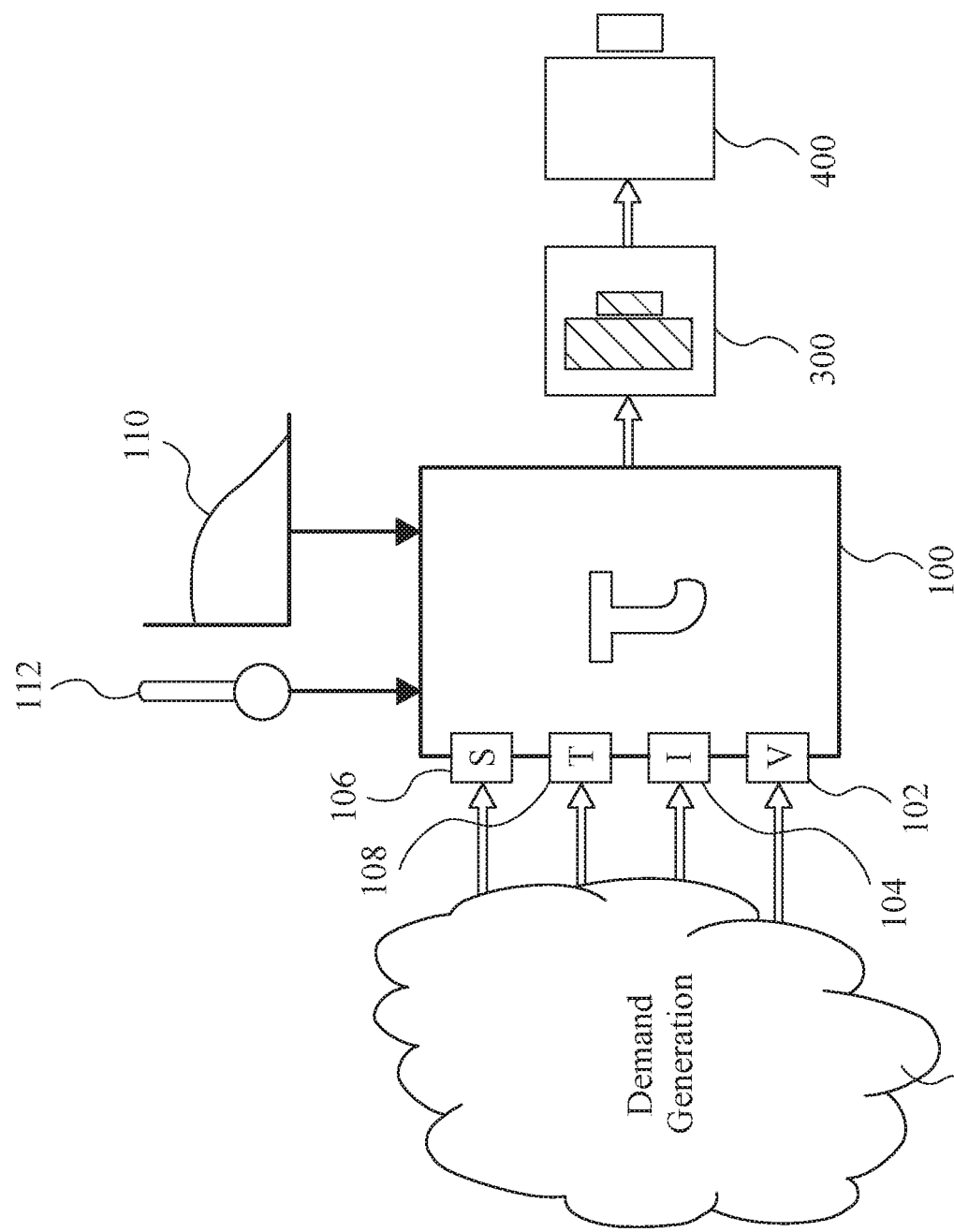
FIG. 1 shows an overview schematic of an apparatus for controlling an electric motor.

Another aspect of the disclosure relates to an apparatus for controlling the torque demand sent to an electric motor. An example apparatus is shown in FIG. 1. The apparatus comprises a first input configured to receive at least one electrical limit corresponding to an electrical parameter of a DC link electrical supply, a second input configured to receive at least one mechanical limit corresponding to a mechanical parameter of the electric motor, and a controller configured to sense the DC link electrical supply for the at least one electrical parameter and adjust the mechanical limit based on a comparison with the electrical limit for that sensed electrical parameter. The controller is configured to receive a torque demand and adjust the torque demand based on a comparison with the adjusted mechanical limit.

The example apparatus shown in FIG. 1 comprises a controller 100. The controller 100 comprises at least two inputs coupled to a demand generator 200, for example a vehicle control unit, VCU. In some examples the controller 100 is also coupled to a battery management system, BMS. The controller 100 is also coupled to a motor controller 300, which in turn is coupled to an electric motor 400. The motor controller 300 may be coupled to a power source, such as a battery, via a DC link. The motor controller 300 may comprise a motor control algorithm configured to control the electric motor based on the torque request it receives from the controller 100. The motor controller 300 also comprises an inverter coupled to the DC link. The motor control algorithm is configured to receive torque request instructions (for example, a torque set-point) from the controller 100 and control currents in the electric motor 400 via operation of the inverter.

The at least two inputs are configured to receive signals from the demand generator 200. The signals comprise at least one limit of an electrical or mechanical parameter. The first input is configured to receive at least one electrical limit corresponding to an electrical parameter of a DC link electrical supply. The second input is configured to receive at least one mechanical limit corresponding to a mechanical parameter of the electric motor.

The controller 100 is configured to sense the DC link electrical supply for the at least one electrical parameter and adjust the mechanical limit based on a comparison with the electrical limit for that sensed electrical parameter. The controller is also configured to receive a torque demand and adjust the torque demand based on a comparison with the adjusted mechanical limit.

Figure 3:
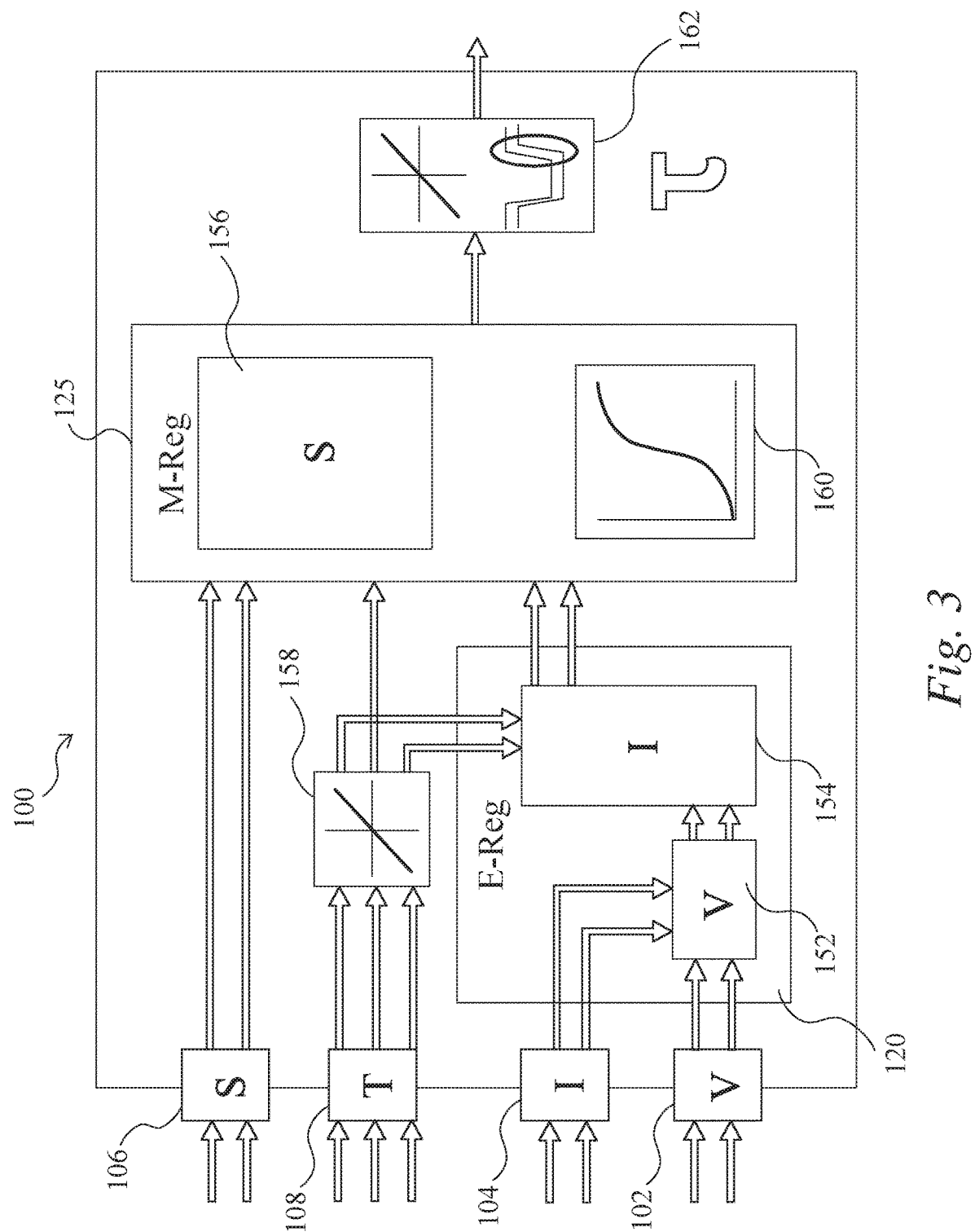
FIG. 3 shows a schematic of elements of an apparatus for controlling the torque demand sent to an electric motor such as the apparatus shown in FIG. 1.
Figure 4:
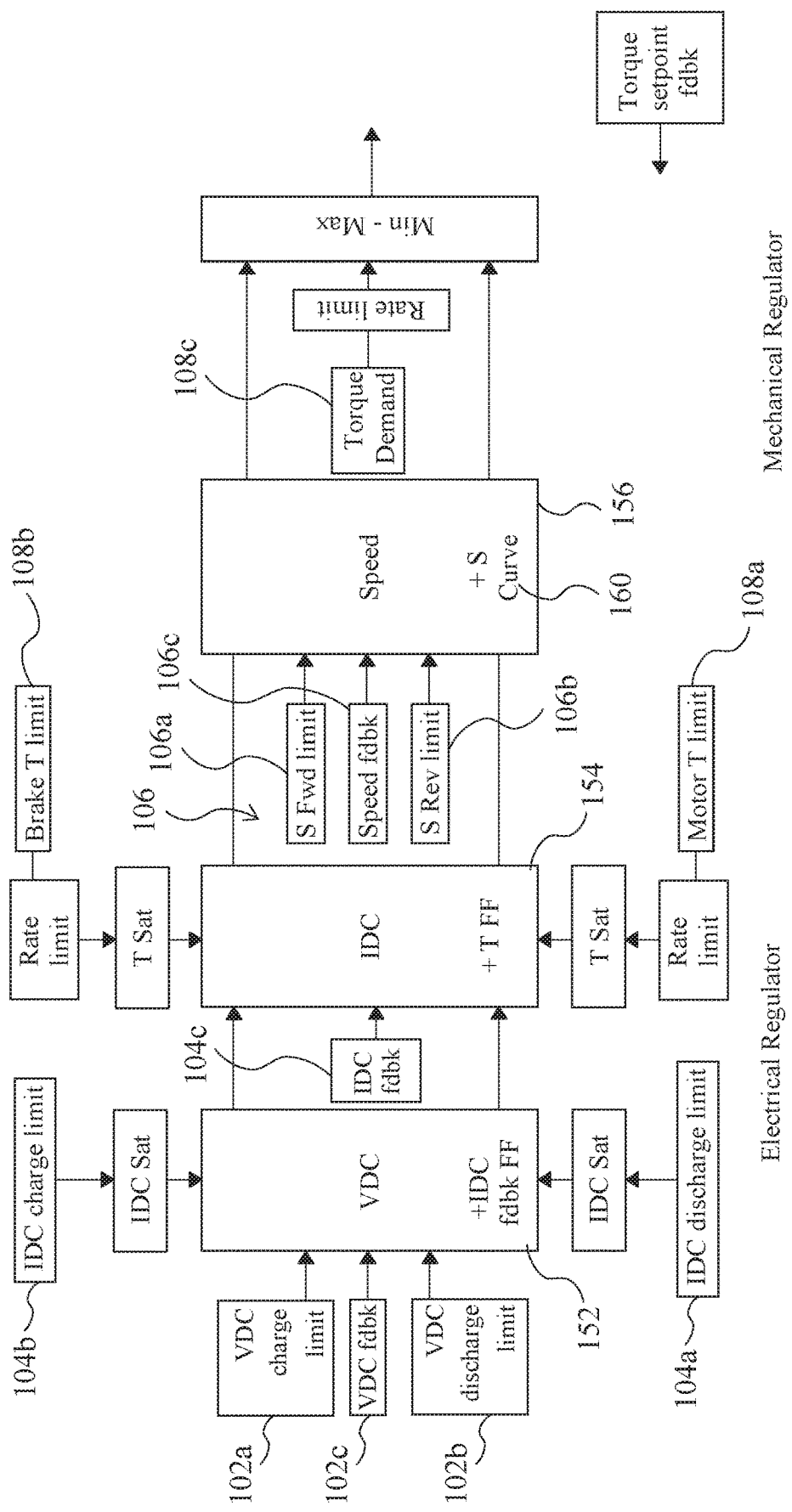
FIG. 4 shows an example flow chart of a method for controlling an electric motor.

In the example shown in FIGS. 1, 3 and 4, the first input actually comprises two inputs, a voltage input 102 and a current input 104. The second input also actually comprises two inputs, a speed input 106 and a torque input 108. The first input is configured to receive two electrical parameters comprising two electrical limits, the two electrical limits comprising a DC link current limit and a DC link voltage limit. The second input is also configured to receive two mechanical limits, the two mechanical limits comprising a torque limit and a speed limit.

The controller 100 is configured to sense the DC link voltage and adjust the DC link current limit based on a comparison of the DC link voltage with the DC link voltage limit to provide an adjusted DC link current limit. The controller 100 is configured to sense the DC link current and then adjust the torque limit based on a comparison of the DC link current with the adjusted DC link current limit. The 100 controller is configured to then sense the speed of the electric motor and further adjust the adjusted torque limit based on a comparison of the speed with the speed limit. Finally, the controller 100 is configured to receive a torque demand and adjust the torque demand based on a comparison with the adjusted torque limit.

In some examples, the controller is configured to adjust an electrical or mechanical limit if a sensed electrical or mechanical parameter hits its corresponding electrical or mechanical limit. For example, the mechanical limit may be adjusted in response to the sensed electrical parameter hitting the corresponding electrical limit. Hitting a limit may comprise equaling or exceeding that limit.

For example, the controller 100 may be configured to adjust the DC link current limit in response to the sensed DC link voltage hitting the DC link voltage limit. In some examples the controller 100 is configured to adjust the torque limit in response to the sensed DC link current hitting the adjusted DC link current limit. In some examples the controller 100 is configured to adjust the adjusted torque limit in response to the sensed speed hitting the speed limit. In some examples the controller 100 is configured to adjust the torque demand in response to the torque demand hitting the adjusted torque limit.

In some examples, the electrical or mechanical limit may comprise a maximum and minimum limit. It will therefore be understood that adjusting a limit for a parameter may comprise adjusting a maximum or a minimum limit for that parameter, or adjusting both maximum and minimum limits for that parameter.

For example, in the example shown in FIGS. 1, 3 and 4, the current input 104 receives two current limits:

Maximum DC link discharging current 104*a*
Maximum DC link charging current 104*b*

In the example shown in FIGS. 1, 3 and 4, the voltage input 102 receives two voltage limits:

Maximum DC Link voltage 102*a*
Minimum DC Link voltage 102*b*

In the example shown in FIGS. 1, 3 and 4, the speed input receives two speed limits:

Maximum forward speed 106*a*
Maximum reverse speed 106*b*

In the example shown in FIGS. 1, 3 and 4, the torque input receives:

Torque demand 108*c*
Maximum motoring torque 108*a*
Maximum braking torque 108*b*

The controller 100 may therefore receive 9 inputs from the demand generator 200. These inputs received from the demand generator 200 may be called STIV inputs, due to the fact that they may comprise speed, S, torque, T, current, I, and voltage, V, limits. The current 104 and voltage 102 inputs may relate to current and voltage supplied on a DC link to the electric motor controller 300. Additionally or alternatively, if the controller 100 is also coupled to a BMS, the controller 100 may be configured to receive electrical limits relating to an electrical parameter of the DC link electrical supply from the BMS, such as a voltage limit and/or a current limit.

Figure 2:
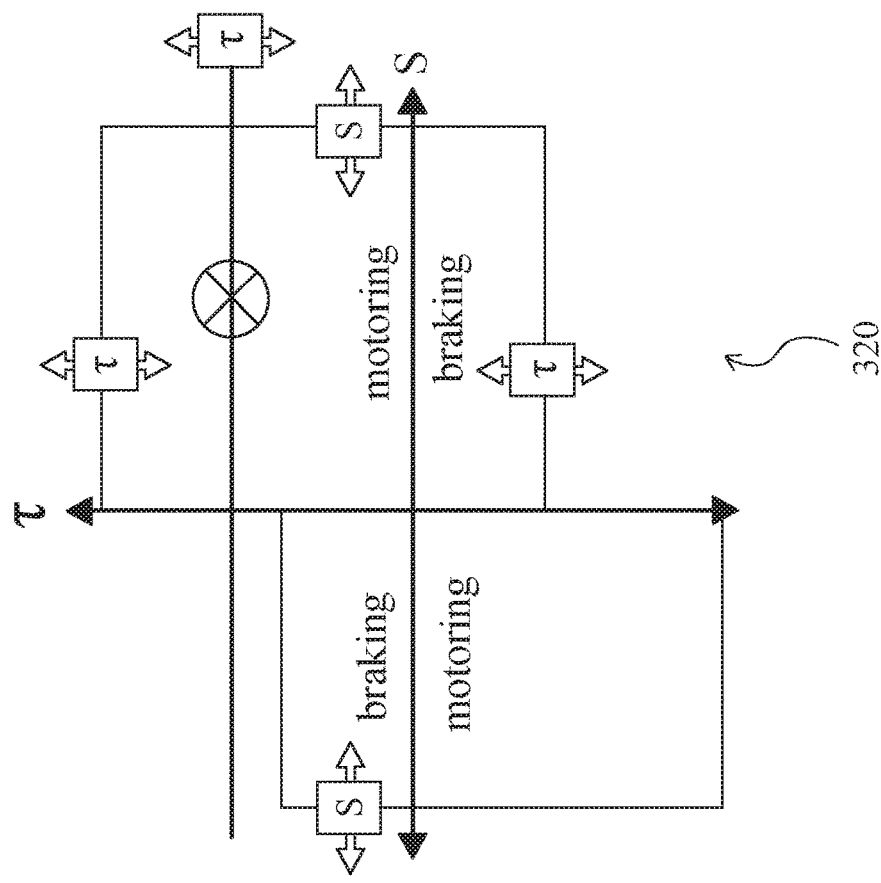
FIG. 2 shows two graphs showing a range of limits acting on parameters of an electric motor, including limits acting on the DC link to the electric motor and mechanical limits of the electric motor.
Figure 2:
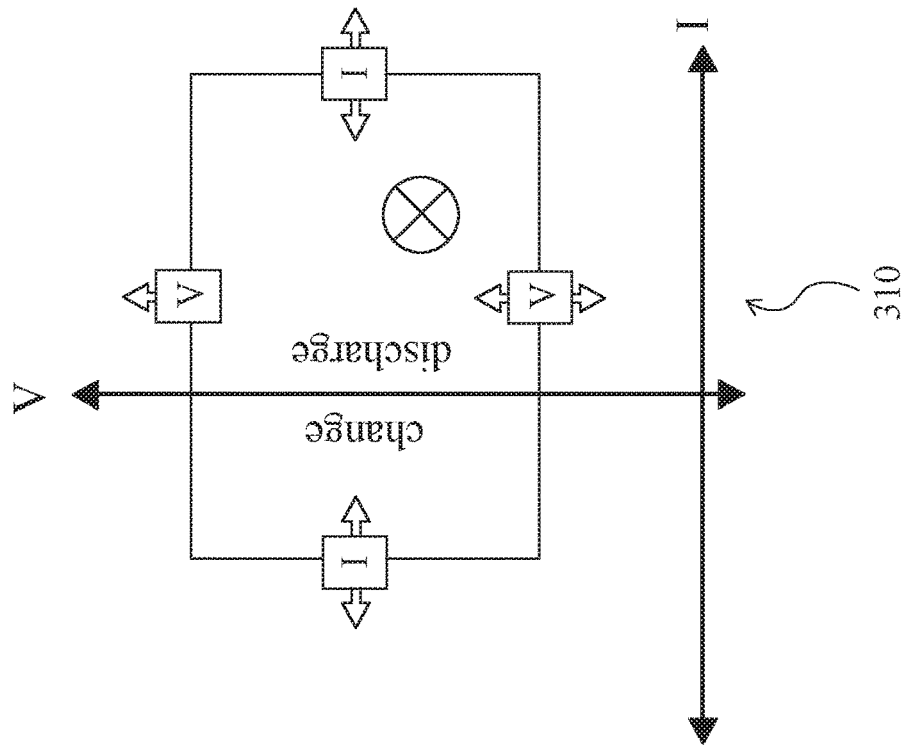

The mechanical limits can be viewed on a speed-torque plane 320 and the electrical limits on a voltage-current plane 310, as shown in FIG. 2. The limits trace out a box in each plane. Eight STIV signals set the edges of the boxes. A ninth input received by the controller sets a desired torque (i.e. torque demand). The operating point X of the controller 100 is the present operating condition—the present DC link voltage 102*c* and current 104*c* in the electrical plane 310 and the present speed and torque in the mechanical plane 320. These operating points move as the electric motor operates. In this example shown in FIG. 2, at this point in time: the motor is "motoring" in "forward" and is not close to any speed or torque limits, and the DC link is "discharging" and is not close to any I or V limits.

With the STIV inputs, it is possible to create traction systems with hill-hold, generators with multistage charging profiles and hybrid systems. The controller 100 will respect the STIV inputs and it is possible to create accurate and powerful systems with careful consideration to the STIV inputs.

A relationship between speed and torque (i.e. power) for the motor 400 may be another input 110 to the controller 100. The relationship may be a speed-torque relationship at least partially characteristic of the electric motor 400. The controller may be configured to compare and adjust the torque demand with the speed-torque relationship so that the torque demand may be less than the torque according to the speed-torque relationship. In effect, the speed-torque relationship may put an upper limit on the maximum braking torque and maximum motoring torque and therefore the torque demand may be adjusted based on the speed-torque relationship.

Temperature may be another input 112 into the controller 100. For example, the controller 100 may be coupled to a temperature sensor. The controller 100 may be configured so that the torque limit is adjusted based on a received temperature signal. For example, the controller 100 may be configured to provide thermal cutback from the temperature sensor. For example, when either the motor 400 or controller 300 is hot, the maximum torque (for example, one of the maximum motoring torque, the maximum braking torque, or the speed-torque curve) may be reduced. For example, the maximum motoring torque may be reduced as a function of increasing temperature.

The controller 100 senses each of the parameters relating to each of the inputs 102, 104, 106, 108. When the operating point of one of these parameters hits the edge of one of the boxes shown in FIG. 2, the controller 100 adjusts the output torque request to keep the operating point inside the boxes. In some examples the electrical parameters may be prioritised over the mechanical parameters, so that the limits defined by the electrical box have priority. In some examples, the torque limits may have priority, followed by the voltage limits, the current limits and the speed limits. This prioritisation of the limits may be inherent in the "cascade structure" of the controller 100, explained in more detail below and as shown in FIG. 3.

The structure of the controller is shown in more detail in FIG. 3. The controller 100 uses a cascade structure where limits are respected by commanding the related physical value. The cascade structure comprises:

An E-reg (electrical regulator) 120 coupled to the first (electrical) input, configured to sense and respect the V and I limits (keep the operating point within the electrical box);

An M-reg (mechanical regulator) 125 coupled to the second (mechanical) input, configured to sense and respect the S and T limits (keep the operating point within the mechanical box);

An optional torque rate of change regulator 162 acting as a backlash compensator configured to manage the drivetrain characteristics;

An optional thermal regulator configured to modify the output torque request based on a temperature (not shown);

An optional power regulator (not shown);

An optional acceleration regulator 160;

An optional torque rate regulator 158.

The electrical regulator 120 comprises two regulators; a voltage regulator 152 and a current regulator 154. The voltage regulator 152 is coupled to voltage input 102 and current input 102. The current regulator 154 is coupled to the voltage regulator 152 and the torque input 108. The mechanical regulator 125 also comprises two regulators; a speed regulator 156 and an optional acceleration regulator 160. The mechanical regulator 125 is coupled to the speed input 106, the torque input 108 and to the current regulator 154. In some examples, the mechanical regulator 125 is further coupled to the optional torque rate of change regulator 162.

FIG. 4 shows a flowchart of the way that inputs feed into the regulators and how the inputs are processed by the regulators.

The voltage regulator 152 is configured to receive a maximum DC link voltage limit 102a and a minimum DC link voltage limit 102b from voltage input 102. It is also configured to sense the DC link voltage 102c. The voltage regulator 152 is also configured to receive a maximum DC link discharging current 104a and a maximum DC link charging current 104b from current input 104. The voltage regulator 152 is configured to compare the sensed DC link voltage 102c with the voltage limits 102a, 102b and adjust the current limit based on the comparison with the voltage limits 102a, 102b. The voltage regulator 152 is configured to provide adjusted currents limits 104a, 104b to the current regulator 154.

The current regulator 154 is configured to receive an input from the voltage regulator 152 comprising the adjusted current limits 104a, 104b, and also sense the DC link current 104c. The current regulator 154 is also configured to receive a maximum braking torque 108b and a maximum motoring torque 108a from torque input 108. The current regulator 154 is configured to compare the sensed DC link current 104c with the current limits 104a, 104b from the voltage regulator 152 and adjust the torque limits 108a, 108b based on the comparison with the current limits 104a, 104b. The current regulator is configured to provide adjusted torque limits 108a, 108b to the speed regulator 156.

The speed regulator 156 is configured to receive an input from the current regulator 154 comprising the adjusted torque limits 108a, 108b. The speed regulator 156 is also configured to receive a motor maximum forward speed 106a, a motor maximum reverse speed 106b from the speed input 106, and also sense the current motor speed 106c. The speed regulator 156 is configured to compare the current speed 106c with the speed limits 106a, 106b and further adjust the adjusted torque limits 108a, 108b based on the comparison with the speed limit.

Otherwise, the controller 100 is configured to sense a torque demand 108c received via the torque input 108 and compare the torque demand 108c with the adjusted torque limits 108a, 108b output by the speed regulator 156. The controller 100 is configured to adjust the torque demand 108c based on the comparison with the adjusted torque limits 108a, 108b, and output the adjusted torque demand 108c as a torque request to the electric motor controller 300.

In operation, the voltage regulator 152 senses the DC link voltage 102c. When the voltage hits a voltage limit 102a, 102b, the voltage regulator 152 adjusts the DC link current limits 104a, 104b. The current regulator 154 senses the DC link current 104c. When the current 104c hits a current limit 104a, 104b, the current regulator 154 adjusts the torque limits 108a, 108b. The speed regulator 156 senses the motor speed 106c. When the speed 106c hits a speed limit 106a, 106b, the speed regulator 156 adjusts the torque limits 108a, 108b. The controller 100 senses a received torque demand 108c and adjusts the torque demand 108c based on a comparison with the adjusted torque limits 108a, 108b. The adjusted torque demand 108c may be output as a torque request to the motor controller 300. Therefore DC link voltage limits 102a, 102b are respected by commanding DC link current limits 104a, 104b (Ohm's law). DC link current limits 104a, 104b are respected by commanding motor torque limits 108a, 108b (electrical-mechanical conservation of energy). Motor speed limits 106a, 106b are respected by commanding motor torque limits 108a, 108b (from F=ma).

Accordingly, another aspect of the disclosure relates to a method of controlling an electric motor 400. The method comprises setting a limit 104a, 104b of the DC link current 104c based on sensing the DC link voltage 102c, and adjusting this current limit 104a, 104b based on a comparison of the voltage 102c with the voltage limit 102a, 102b, setting a torque limit 108a, 108b based on sensing: (a) the DC link current 104c and (b) the speed 106c; and adjusting the torque limit 108a, 108b based on (a) a comparison of the DC link current 104c with the current limit 104a, 104b, and/or (b) a comparison of the speed 106c with the speed limit 106a, 106b.

Figure 5:
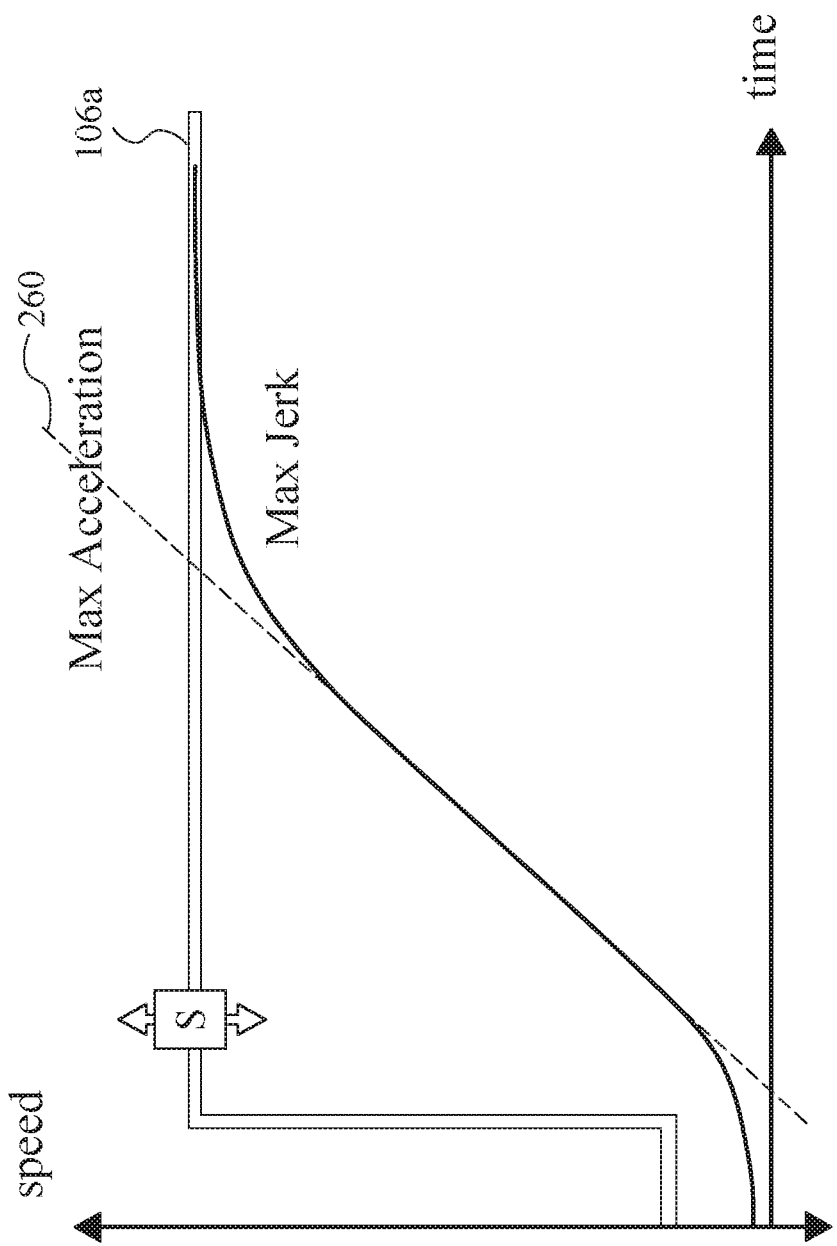
FIG. 5 shows an example speed-time curve for an electric motor operating according to a method such as that shown in FIG. 4.

In some examples, the controller 100 may control maximum acceleration and/or jerk when approaching one of the speed limits 106a, as shown in FIG. 5. A jerk limit may be considered a limit of the rate of change of acceleration. The controller 100 may comprise an acceleration regulator 160. The acceleration regulator 160 may be part of the mechanical regulator 125 and be coupled to the speed input 106. The acceleration regulator 160 may also be coupled to the speed regulator 156. The acceleration regulator 160 may have a known acceleration limit (for example the acceleration limit may have been pre-programmed) or may receive an acceleration limit via an input, for example from the demand generator 200.

The acceleration regulator 160 may be configured to receive at least one speed limit 106a, 106b from the speed input 106, and compare the sensed speed 106c (and thereby acceleration and optionally rate of change of acceleration) with an acceleration limit and/or a rate of change of acceleration limit. Based on the comparison with the acceleration limit and/or the rate of change of acceleration limit, the acceleration regulator 160 may adjust the speed limits 160a, 106b to meet the acceleration limit and/or the rate of change of acceleration limit. For example, this may comprise adjusting the speed limits 106a, 106b over time so that the acceleration meets the acceleration limit, or adjusting the speed limits 106a, 106b over time so that the rate of change of acceleration meets the acceleration rate of change limit. The adjusted speed limits 106a, 106b provided by the acceleration regulator 160 may be used by the speed regulator 156. The speed regulator 156 may compare the sensed speed 106c with the adjusted speed limits 106a, 106b (provided by the acceleration regulator 160) and adjust the torque limits 108a, 108b based on a comparison of the sensed speed 106c with the adjusted speed limits 106a, 106b.

The acceleration regulator 160 may also be used for loss of traction (or load) situations, where the acceleration limit may be set somewhat larger than the acceleration which can be achieved by the motor 400 under normal conditions.

The controller 100 may also comprise an optional torque rate of change regulator 162. The torque rate of change regulator 162 may have a torque rate of change limit, and may for example act as a backlash compensator. As for the acceleration limit for the acceleration regulator 160, the torque rate of change limit may be pre-programmed into the torque rate of change regulator 162, or may be received by an input, for example from the demand generator 200. The electric motor 400 may be coupled to a drivetrain that, for example, connects it to wheels for traction. The drivetrain may have its own characteristics, and if instantaneous acceleration is too high, can result in the drivetrain unwinding.

The torque rate of change regulator 162 may prevent the change in torque being greater than the drivetrain can manage (thus preventing resultant backlash). The torque rate of change regulator 162 may do this by sensing the torque demand 108c over time to determine the torque rate of change, and by comparing the torque rate of change with the torque rate of change limit. Based on the comparison with the torque rate of change limit the torque rate of change regulator may adjust the torque demand 108c. The torque rate of change regulator 162 may limit instantaneous acceleration, such as that which occurs when drivetrains unwind.

In some examples, the torque rate of change regulator 162 may be configured to prevent a quick change in torque through zero speed resulting in "clunk" due to gear lash. In these examples the torque rate of change regulator 162 may sense the speed 106c of the motor 400 and comprise a separate torque rate of change limit 108a, 108b when the speed passes through zero. This may be considered an "open loop" approach. For example, the torque rate of change regulator 162 may have different torque rate of change limits for different operating speeds 106c or speed ranges.

In some examples, the torque rate of change regulator 162 uses sensed acceleration as a negative feedback to compensate the torque output. For example, typically drivetrain issues like windup and gear lash result in very fast accelerations for very short times. The negative feedback acceleration feedback may deal with this. For example, the torque rate of change regulator 162 may be configured to sense acceleration (for example by sensing speed 106c over time) and adjust the torque demand 108c based on a comparison with the acceleration, for example the torque rate of change regulator 162 may be configured to adjust the torque demand based on an inverse relationship with sensed acceleration.

As noted above, temperature may be another input 112 into the controller 100. The controller 100 may comprise a thermal regulator. The thermal regulator may be configured to sense the current temperature and compare the current temperature to a temperature limit. The thermal regulator may be configured to adjust the torque limits 108a, 108b based on the comparison with the temperature limit, for example the thermal regulator may be configured to adjust the torque limits 108a, 108b in response to the sensed temperature hitting the temperature limit. The temperature limit may be pre-programmed or may be received via an input, for example from the demand generator 200.

In some examples one or more of the regulators may be switched off, and the functionality of that regulator provided, for example, by a look up table or another element external to the controller 100. For example, the controller 100 may be configured to receive an input from a BMS. The BMS may produce a maximum charge 102a and maximum discharge 102b current value based on a battery state of charge. In this case, the BMS may control the DC link voltage 102c and the controller voltage regulator 152 can be turned off.

In some examples the current regulator 154 may be switched off. In some examples, the current regulator 154 may be replaced by a look up table that reduces the current limits 102a, 102b as a function of voltage. Similarly, the speed regulator 156 may be switched off and the torque limits 108a, 108b adjusted as a function of speed, for example according to a look up table.

In the examples described above, each regulator may be used to respect one limit for a parameter, or both the minimum and maximum limits for a parameter. It will be understood, however, that separate regulators may be used to respect the minimum and maximum limits. For example, the voltage regulator may comprise a first voltage regulator to compare the sensed DC link voltage 102c with a voltage charge limit 102a and a second voltage regulator to compare the sensed DC link voltage 102c with a voltage charge limit 102b. In a similar way, the current regulator 154, acceleration regulator 160, speed regulator 156 and torque rate of change regulator may comprise respective first and second regulators.

The torque request sent to the motor controller 300 will follow the torque demand 108c received by the controller 100 provided this respects the electrical and mechanical limits 102a, 102b, 104a, 104b, 106a, 106b, 108a, 108b, as indicated in FIG. 2. When the operating point touches an edge (limit), and accordingly adjusts the output torque request, it touches only one of the edges and the edge is one of the STIV inputs. At any point we can trace the output torque request back to the one of the STIV inputs. In some examples, the controller 100 can report this via a "What's Active" property.

TABLE 1

| Value | What STIV Input is determining Output Torque |
|---|---|
| 11 | Max Braking Torque |
| 12 | Demand Torque |
| 13 | Max Motoring Torque |
| 21 | Max Forward Speed |
| 23 | Max Reverse Speed |
| 31 | Max DC Link Discharge Current |
| 33 | Max DC Link Charge Current |
| 41 | Max DC Link Voltage |
| 43 | Min DC Link Voltage |
| 0 | I'm confused and don't know |

The controller's "What's Active" property has a special format made up of two 16-bit values which can indicate which of the STIV inputs is being followed, as indicated in Table 1, above. In the controller 100, there may be as many as 6 regulators or more. At any point in time the only active regulators are those involved in the "What's Active" path. Most of the regulators are "sensing and waiting" to make sure that a limit is respected; they are not actually doing anything and are "open loop". Each regulator uses several methods to be well-behaved while "sensing and waiting" including aggressive anti-windup techniques and limiting the output of any regulator to that which will be allowed by the output torque rate limit. In some examples the regulators may be prevented from winding up dynamically and/or statically. Statically means that the regulators won't windup past a selected limit. Dynamically means that they won't windup into the final torque rate limit during a fast change in operating point. For example, the limits used by the regulators may track the operating point by an amount that is related to the out rate limit (for example, a percentage of the limit such as 90%) so that the regulators may be prevented from winding up into their limits.

Some of the regulators may also use feedforward terms. Feedforward estimates what the output of a regulator should be for a desired input. The feedforwards may be used to bypass the regulators to speed up their response to quick changes in the sensed parameter. The feedforward for the voltage regulator 152, for example, may be the DC link current feedback (which may be reduced slightly with a gain). The voltage regulator 152 may therefore only be used to make corrections to the operating point for that parameter. The feedforward for the current regulator 154 may be an estimate of the torque required to hit the current set-point from the voltage regulator 152. Feedforward does not need to be exact (for example, only 90% of the estimated output value may be used), but it may do much of the "heavy lifting" in the regulators and may improve response.

The speed regulator 156 may also have a "high resolution" position feature to allow speed tracking for changing demands and for low speed "hill hold" operations. The high resolution position feature makes use of position feedback (of the electric motor) and it is a higher order regulator than the normal speed regulator. The high resolution position feature may have two primary advantages: it can track a ramp with zero steady state error, and it can truly hold zero speed since it regulates position. It provides a significant improvement in hill-hold situations. Typically the high resolution speed regulator is used for accurate speed/position during hill-hold & roll-off. It may also provide more precise speed control in applications such as automated guided vehicles, AGV. While it can be used at all times, its more aggressive application of torque tends to feel unnatural. The use of the high resolution speed regulator is entirely configurable: it can always be used, never be used, or only used at lower speeds.

In some examples, the controller 100 may also comprise a torque rate regulator 158 coupled to the torque input 108 and the input to the current regulator 154. The torque rate regulator 158 may be configured to limit a rate of change in the torque limits 108a, 108b. For example, the torque rate regulator 158 may be configured to sense the torque limits 108a, 108b and in response to the torque limits 108a, 108b changing, compare their rate of change with a rate of change limit or relationship (for example, the torque rate of change limit may be a function of speed or may depend on whether the torque relates to motoring torque or braking torque) and if necessary adjust the torque limits 108a, 108b to meet the stored torque rate of change limit.

Additionally or alternatively, the torque rate regulator 158 may be configured to sense the torque demand 108c and in response to the torque demand 108c changing, compare its range of change with a rate of change limit or relationship (for example the rate of change limit may be a function of speed or depend on whether the torque relates to motoring torque or braking torque) and if necessary adjust the torque demand 108c to meet the torque rate of change limit. In this way, the torque rate regulator 158 may prevent step changes in the torque request on step changes in the inputs. Thus if a torque limit on STIV is reduced abruptly in such a way that the output torque request must be reduced, the torque is ramped down in a controlled manner. In some examples there is a ramp-up and ramp-down rate for motoring torque, and a ramp-up and ramp-down rate for braking torque.

In some examples, the controller 100 may also comprise an optional power regulator. The power regulator may be coupled to the torque input 108, and if present optionally operate in conjunction with the torque rate regulator 158. For example, the power regulator may be configured to receive an adjusted torque demand 108c or adjusted torque limits 108a, 108b from the torque rate regulator 158. The power regulator may be configured to receive a relationship between speed and torque (i.e. power) for the motor 400, for example via input 110 to the controller 100. The relationship may be a speed-torque relationship at least partially characteristic of the electric motor 400. The power regulator may be configured to sense the torque demand 108c and compare and adjust the torque demand 108c with the speed-torque relationship so that the torque demand 108c may be less than the torque according to the speed-torque relationship. The adjusted torque demand 108c may then be fed into the electrical regulator 120, for example the current regulator 154. In effect, the speed-torque relationship may put an upper limit on the maximum braking torque 108b and maximum motoring torque 108a and therefore the torque demand 108c may be adjusted based on the speed-torque relationship.

It will be appreciated from the discussion above that the embodiments shown in the Figures are merely exemplary, and include features which may be generalised, removed or replaced as described herein and as set out in the claims. With reference to the drawings in general, it will be appreciated that schematic functional block diagrams are used to indicate functionality of systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

The activities and apparatus outlined herein may be implemented with fixed logic such as assemblies of logic gates or programmable logic such as software and/or computer program instructions executed by a processor. Other kinds of programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof.

The invention claimed is:

1. An apparatus for controlling the torque demand sent to an electric motor, the apparatus comprising:
    a first input configured to receive at least one electrical limit corresponding to an electrical parameter of a DC link electrical supply;
    a second input configured to receive at least one mechanical limit corresponding to a mechanical parameter of the electric motor; and
    a controller configured to sense the DC link electrical supply for the at least one electrical parameter and adjust the mechanical limit based on a comparison with the electrical limit for that sensed electrical parameter; and
    wherein the controller is configured to receive a torque demand and adjust the torque demand based on a comparison with the adjusted mechanical limit;
    wherein the first input is configured to receive two electrical parameters comprising two electrical limits, the two electrical limits comprising a DC link current limit and a DC link voltage limit, and wherein the controller is configured to sense the DC link voltage and adjust the DC link current limit based on a comparison of the DC link voltage with the DC link voltage limit to provide an adjusted DC link current limit.

2. The apparatus of claim 1 wherein the at least one mechanical limit comprises a torque limit, and wherein the controller is configured to adjust the torque limit based on a comparison of the DC link current with the adjusted DC link current limit to provide an adjusted torque limit.

3. The apparatus of claim 2 wherein the at least one mechanical parameter comprises a speed of the electric motor and the at least one mechanical limit comprises a speed limit and wherein the controller is configured to sense the speed of the electric motor and further adjust the adjusted torque limit based on a comparison of the speed with the speed limit.

* * * * *